United States Patent [19]
Wood et al.

[11] Patent Number: 4,598,953
[45] Date of Patent: Jul. 8, 1986

[54] ELECTROPNEUMATIC BRAKE CONTROL SYSTEM FOR RAILWAY TRANSIT VEHICLE

[75] Inventors: James A. Wood, McKeesport; Richard J. Mazur, Pittsburgh, both of Pa.

[73] Assignee: American Standard Inc., Wilmerding, Pa.

[21] Appl. No.: 745,479

[22] Filed: Jun. 17, 1985

[51] Int. Cl.[4] .......................... B60T 8/02; B60T 8/58; B60T 13/74
[52] U.S. Cl. .......................................... 303/3; 303/15; 303/22 R; 303/36; 303/38; 303/71; 303/92; 303/100; 303/20
[58] Field of Search ............. 303/3, 33, 36, 15, 68-69, 303/22 R, 22 A, 92, 100, 101, 20, 6 M, 71, 35, 37-39, 41-46, 66, 86, 81; 188/195

[56] References Cited
U.S. PATENT DOCUMENTS

| | | | |
|---|---|---|---|
| 3,398,815 | 8/1968 | Brath et al. | 188/195 |
| 3,398,993 | 8/1968 | Sarbach et al. | 303/20 |
| 3,490,814 | 1/1970 | Smith et al. | 303/20 |
| 4,045,093 | 8/1977 | Bridigum | 303/3 |
| 4,199,195 | 4/1980 | Pekarcik et al. | 303/3 |
| 4,533,185 | 8/1985 | Krause | 303/3 |

OTHER PUBLICATIONS

WABCO Instruction Pamphlet G-g-2616-1, Jun. 1969, Wilmerding, Pa., entitled "RT-5A Brake Equipment".

Primary Examiner—Douglas C. Butler
Attorney, Agent, or Firm—G. J. Falce

[57] ABSTRACT

An electropneumatic brake system for a railway vehicle having an electronic control unit that outputs a friction brake demand signal according to the difference between a brake command signal and a feedback signal representative of the effective dynamic brake, whereby the total dynamic and friction brake effort corresponds to the brake command signal. The brake system also includes a pneumatic operating unit having a pair of high-capacity, electropneumatic valves operated by the friction brake demand signal to regulate the pneumatic pressure at the brake unit directly, that is, without an intermediary relay valve. Such an arrangement provides better response and more accurate pressure feedback of the friction brake level to the electronic control unit. A service rate control choke is located ahead of the electropneumatic valves, which allows these valves to perform the emergency and wheel-slip control functions without requiring independent valves for this purpose, by virtue of their high-capacity capability.

31 Claims, 6 Drawing Figures

ELECTROPNEUMATIC BRAKE CONTROL SYSTEM FOR RAILWAY TRANSIT VEHICLE

BACKGROUND OF THE INVENTION

The present invention is concerned with electronically-controlled railway vehicle brake systems, and particularly to such systems in which electropneumatic application and release magnet valves are employed to regulate the friction brake forces in accordance with digital control signals generated by an electronic control unit.

In an earlier designed RT-5 type brake equipment, manufactured by the Westinghouse Air Brake Company, there is shown in FIG. 1 of the drawings a G-4 type pneumatic-operating unit having an N-2D magnet valve portion comprising low-capacity application and release magnet valves that operate to regulate the vehicle brake cylinder pressure via a high-capacity J-1 relay valve device, the latter being necessary to satisfy the high-capacity air requirement of the brake cylinder. Since these application and release magnet valves are low-capacity, the emergency and wheel-slip control functions, which require fast response, must be handled by additional pneumatic components; such as, an A-2 reduction relay valve and a B-3-C decelostat valve. Thus, a large number of pneumatic components are required to provide the service, emergency, and wheel-slip functions. This high-component count results in high weight, low reliability, high cost, slow response, and reduced accuracy. In addition, such an arrangement is complicated to adapt to different transit applications, since a great deal of the system logic is performed by the pneumatics and the associated piping.

Moreover, in FIG. 1, a pressure-feedback transducer, located between the magnet valves and relay valve, provides the electronic control unit with a signal representative of the brake cylinder pressure, whereby the electronic unit compares the combined dynamic and friction brake levels with the brake command and operates the magnet valves to regulate the brake cylinder pressure according to the difference between the brake command and the total dynamic/friction brake level. Therefore, the pressure regulated is the intermediate pressure, which slows the system response time.

Because of the relatively small control volume of the J-1 relay valve in this arrangement, and the jerk limit or rate control imposed on the brake control signal emitted by the electronic control unit, the application magnet valve exhibits a high cycling characteristic, whereby the J-1 relay valve is operated to develop braking pressure that follows a jerk or rate-controlled buildup-curve having a staircase pattern. While this is desirable in achieving jerk control for optimum passenger comfort, the cycling effect results in a shortened service life of the application magnet valve.

In U.S. Pat. No. 3,398,993, assigned to the assignee of the present invention, there is disclosed an arrangement (as shown here in FIG. 2) in which the brake cylinder pressure is regulated directly via high-capacity type, electropneumatic application and release magnet valves, and thus does not require the interposition of a relay valve to provide the high-capacity requirement of the brake cylinder. Such an arrangement employs a fast-rate choke at the outlet of the application valve to control the maximum rate of brake cylinder pressure buildup, and a pressure transducer between this choke and brake cylinder to provide the electronic control unit with a feedback signal that allows the electronic control unit to regulate the brake cylinder pressure without undue cycling of the magnet valves. Such an arrangement thus reduces the number of pneumatic valve components and lends itself to a normal service life of the application magnet valve. It will be appreciated, however, that since the fast-rate choke is in the line between the brake cylinder and application and release magnet valves, the brake cylinder pressure supply and exhaust is restricted, thus rendering such an arrangement undesirable in terms of employing the high-capacity application and release magnet valves for the emergency and wheel-slip functions. Thus, a relatively large number of pneumatic valve components are required in this arrangement, as well as in the first-discussed arrangement, to provide the service, emergency and wheel-slip control functions.

SUMMARY OF THE INVENTION

An object of the present invention, therefore, is to provide an electronically-controlled, pneumatically-operated railway vehicle brake system having a minium of pneumatic components.

Another object of the invention is to utilize the electropneumatic application and release magnet valves to provide the emergency and wheel-slide functions, as well as the service brake function.

Another object of the invention is to optimize the service life of the application and release magnet valves.

Another object of the invention is to obtain fail-safe operation of the application and release magnet valves under all conditions of failure.

Another object of the invention is to arrange the pneumatic components to operate with either a pressure-applied or a pressure-released brake.

Another object of the invention is to supply separate sources of pneumatic pressure to the brake units in service and emergency braking.

Another object of the invention is to automatically release a service brake application on the vehicle when an electronic malfunction occurs.

Another object of the invention is to provide pneumatically-initiated emergency; either automatically, in the event of a break-in-two, or under control of the operator.

Another object of the invention is to provide wheel-slip operation during an emergency application with provision for cutting out the wheel-slip when the wheel-slip signal persists beyond a predetermined period of time indicative of a signal malfunction.

The invention, according to the foregoing objects, resides in the provision of large-capacity supply and exhaust electropneumatic valves, which satisfy the brake cylinder delivery air requirements without intermediary relay valves or choke restriction devices. A service application choke is located upstream of the electropneumatic valves, and another electropneumatic flow-regulating valve connects supply pressure to the supply valve via the service choke during normal brake applications and in bypass of the service choke during emergency brake applications. Since the exhaust electropneumatic valve exhibits a high-capacity flow capability, and the service choke is located upstream of this valve, the system lends itself to wheel-slip control and emergency brake control without additional valves being required.

In one embodiment of the invention, for example, a pressure brake is employed and the high-capacity exhaust electropneumatic valve is operable, in response to a wheel-slip signal from an electronic control unit, to exhaust brake pressure sufficiently fast to correct the wheel-slip condition. Also, the high-capacity flow-regulating valve is operable in response to an emergency signal to supply braking pressure directly, i.e., in bypass of the service choke.

In another embodiment, the high-capacity flow-regulating valve is arranged to provide separate sources of pneumatic pressure for the service and emergency braking.

In another embodiment of the invention, a spring brake is employed and the high-capacity electropneumatic valves are arranged to supply air to the brake cylinder to release the spring brake, and to exhaust the brake cylinder pressure to cause the spring brake to apply. The flow-regulating valve is arranged to normally exhaust the brake cylinder pressure during service brake control of the supply and exhaust valve, via the service choke, and to bypass the choke in response to an emergency application to obtain an unrestricted exhaust of the spring brake pressure. Also, during service brake control, brake release pressure is supplied to the spring brake unit, via the supply valve, to release the spring brake in response to a wheel-slip signal from the electronic control unit.

Further, by reason of the fact that a service choke is provided via which brake application pressure is supplied to the brake cylinder in the first embodiment, and via which brake pressure is exhausted from the spring brake in the second embodiment, to effect a service brake application, such brake application can be accomplished with minimum cycling of the application valve. The choke can be selected in accordance with the volumes to be pressurized or depressurized, so that the pressure change follows a desired curve predicated on the jerk limit slope of the friction brake command signal supplied to the electronic control unit. Eliminating valve cycling is thus accomplished without compromising response times, thereby realizing an optimum service life of the supply valve.

Moreover, the supply and exhaust electropneumatic valves are pilot-operated by pneumatic pressure from either the main reservoir pipe or the brake pipe to provide an automatic emergency brake application in the event of a break in either of these air lines. When brake pipe pressure is used as the pilot pressure, an emergency brake application may be initiated by the train operator through the well-known brake valve device, or by the train attendant through the well-known conductor valve, to obtain a pneumatically-controlled emergency brake application. These pilot-operated arrangements preclude wheel-slip control during pneumatically-initiated emergency applications, since the electropneumatic valves lose their pilot control and thus cannot be electrically actuated.

If wheel-slip control is desired during an electrically-controlled emergency, an interlock circuit is provided which can bypass the emergency contacts, via which the electropneumatic valves are deenergized in the event a wheel-slip condition arises, in order to energize the exhaust valve and dump brake cylinder air pressure. A timer restores control to the emergency interlock circuit, after a predetermined period of time, and may be reset by a zero speed signal (train stopped), so that only a single wheel-slip correction can be obtained during an emergency application, thereby assuring that the emergency brake application has priority over wheel-slip.

BRIEF DESCRIPTION OF THE DRAWINGS

The foregoing objects and attendant advantages of the invention will become apparent from the following more detailed description and explanation when taken in connection with the accompanying drawings in which.

DESCRIPTION AND OPERATION

Figure 2:
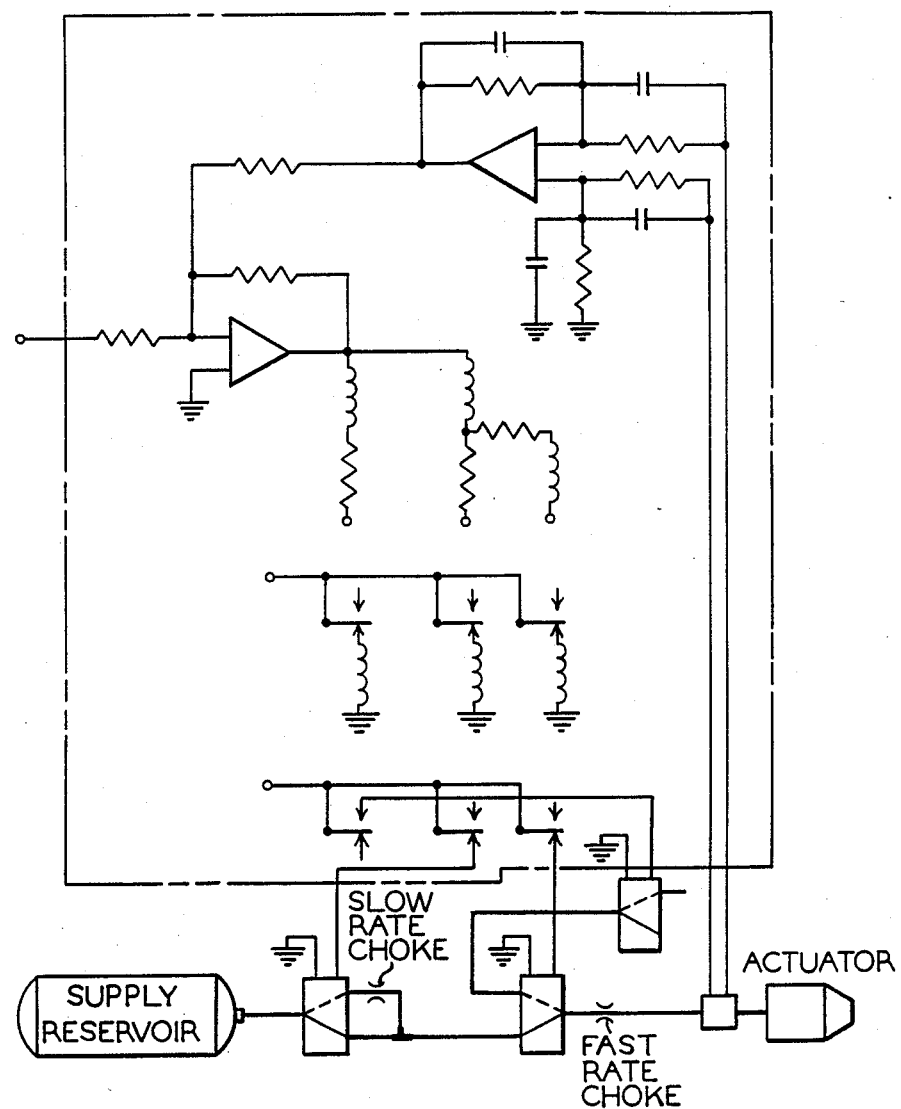
FIG. 2 shows another arrangement of a prior art electro-pneumatic brake system.
Figure 3:
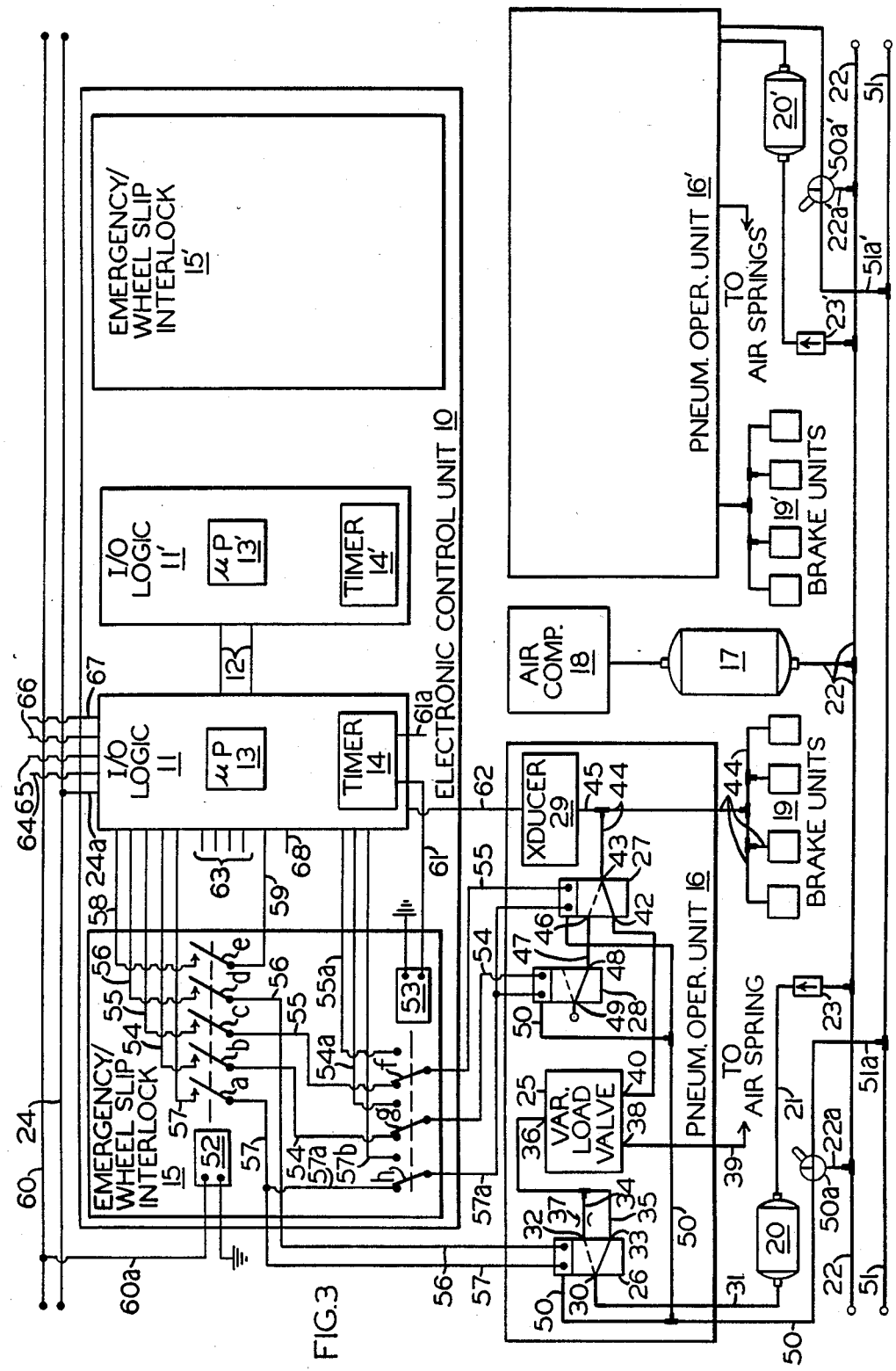
FIG. 3 is a schematic and block diagram of an embodiment showing a pressure-applied brake system in the present invention.

Both embodiments of the invention, as shown in FIGS. 2 and 3, are arranged on a per-truck basis, i.e., common electrical and pneumatic components for each individual truck of a railway car, although the invention is also applicable on a per-car basis. The common electrical components are arranged in a single electronic control unit 10, which comprises input/output logic units 11, 11' for the respective trucks. These logic units are interconnected, via communication wires 12, and include a microprocessor 13, 13' and a timer circuit 14, 14'. Electronic control unit 10 also includes emergency/wheel-slip interlock circuitry 15, 15' for each truck.

A pneumatic operating unit 16, 16' is provided for each truck, with a common source of pneumatic pressure being stored in the vehicle main reservoir 17. As is well-known, the vehicle air compressor 18 maintains main reservoir 17 charged within a predetermined range suitable for use by the pneumatic operating unit 16, 16' associated with each truck and by the vehicle brake units 19, 19'.

Figure 1:
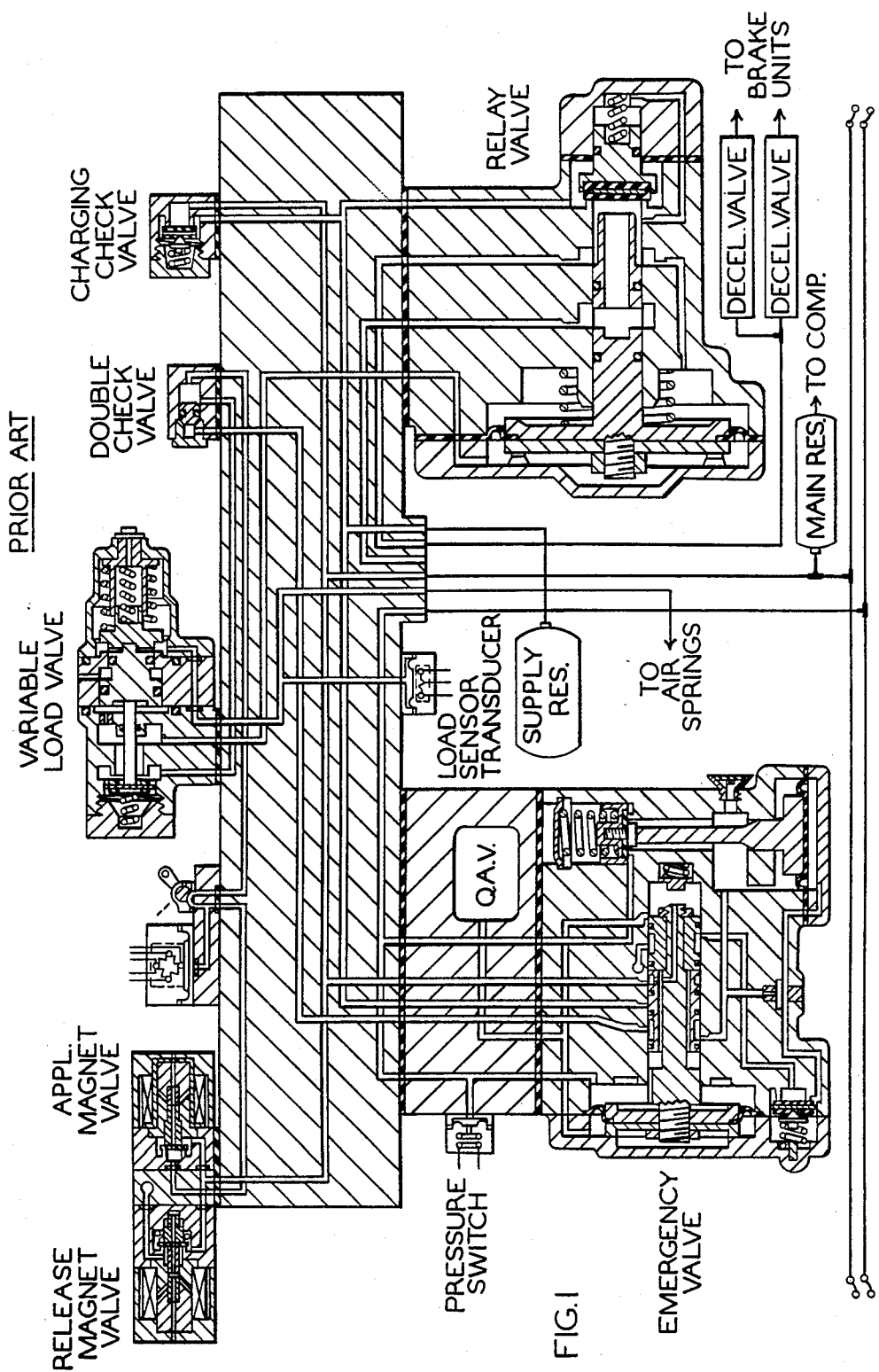
FIG. 1 shows a prior art arrangement of a commercial-type electropneumatic brake equipment.

In the embodiment of FIG. 1, brake units 19, 19' are conventional spring-released, air-actuated devices, such as, disc or tread brake units typically used on railway vehicles operating in transit-type service. A supply reservoir 20, 20', associated with the respective trucks, is interposed in a pipe 21, 21' that extends between main reservoir pipe 22 and pneumatic operating unit 16, 16'. Supply reservoir 20, 20' is charged from main reservoir 17 via a one-way check valve 23, 23' in pipe 21, 21', which prevents loss of supply reservoir pressure in the event main reservoir pipe 22 should break, it being understood that main reservoir pipe 22 extends through each vehicle of the train and is connected therebetween, as by the pneumatic portion of a conventional car coupler (not shown), so as to be continuous. In a similar manner, a brake control wire 24, such as an analog P-wire or other signal conveyance, runs through each car of the train and is interconnected therebetween by the electrical portion of the car couplers, so as to input the brake command signal to logic units 11, 11' of electronic control unit 10 via branch wires 24a and 24a'.

Pneumatic operating unit 16 comprises a variable load valve 25, a flow-regulating valve 26 which supplies brake pressure at either a service or emergency rate, a supply valve 27 and an exhaust valve 28 which cooperate during service brake control to regulate friction brake pressure and also function to control emergency and wheel-slip operation, and a pressure transducer 29 which transmits electrical signals to electronic control unit 10 according to the effective pneumatic brake pressure. These pneumatic components, comprising pneumatic operating unit 16, can be conventional and well-known devices, and therefore, will not be described in detail. Flow-regulating valve 26 and supply valve 27 are pneumatically-piloted, two-position, three-way electropneumatic valves; while exhaust valve 28 is a pneumatically-piloted, two-position, two-way electromagnetic valve. In the deenergized condition of these valves, hereinafter referred to as magnet valves, the solid line shown in the valve envelope symbolically represents the pneumatic connection, while the dotted line symbolically represents the pneumatic connection made in the energized condition. These valves are electrically-actuated through a solenoid operator that acts in conjunction with a pneumatic pilot portion.

The inlet port 30 of flow-regulating magnet valve 26 is connected by a pipe 31 to supply reservoir 20, while outlet ports 32 and 33 are connected by pipes 24 and 35 to the supply port 36 of variable load valve 25. Either port 32 or the pipe 34 at port 32 is provided with a choke 37, so that air may be delivered to port 36 of variable load valve 25 at a normal rate (restricted) when flow-regulating magnet valve 26 is energized, and at an emergency rate (unrestricted) when flow-regulating valve 26 is deenergized. A control port 38 of variable load valve 25 is connected by a pipe 39 to the vehicle air springs (not shown) associated with one truck, while a corresponding pipe 29' connects air from the air spring (not shown) of the other truck to the variable load valve thereof. A delivery port 40 is connected by a pipe 41 to an inlet 42 of supply magnet valve 27, while the delivery port 43 is connected by a piping network 44 to the brake units 19. A branch 45 of pipe 44 connects the pneumatic brake pressure to transducer 29. An outlet port 46 of supply magnet valve 27 is connected by a pipe 47 to an inlet port 48 of exhaust magnet valve 28, and an outlet port 49 of exhaust magnet valve 28 is connected to atmosphere.

Each magnet valve 26, 27 and 28 is air-piloted via a piping network 50 that is connected either to main reservoir pipe 22, or alternatively to a brake pipe 51 that is interconnected (similar to main reservoir pipe 22) between adjacent cars by the pneumatic portion of a conventional, well-known coupler (not shown). Brake pipe 51 is charged in a well-known manner from main reservoir 17 via an operator's brake valve device (not shown). A three-way cock 50a may be employed between pipe network 50 and branch pipes 22a and 51a of the respective main reservoir pipe 22 and brake pipe 51 to select which of these sources of air is desired to pilot the respective magnet valves.

Electrical operation of magnet valves 26, 27 and 28 is controlled by logic unit 11, via a switch network including an emergency relay 52 having SPST switches a, b, c, d and e, and a wheel-slip relay 53 having DPDT switches f, g and h. In the normally energized condition of relay 52, switches a, b, c, d and e are closed. These switches open when relay 52 drops out, as shown. Switch arms h, g and f of relay 53 engage their front contacts in the energized state of the relay and engage their back contacts when the relay drops out, as shown. Switches b, c and d are located in wires 54, 55 and 56 so that they extend between logic unit 11 and one terminal of magnet valves 28, 27 and 26. Switch a is located in a wire 57 that extends between B− at logic unit 11 and the other input of magnet valve 26. Connected between wire 57 and the other terminal of magnet valves 27 and 28, via the back contact of switch h, is a branch wire 57a. The front contacts of switches h, g and f are located in wires 57b, 54a and 55a that lead to logic unit 11, wire 57b being connected to B−. The back contacts of switches h, g and f are located in wires 57a, 54 and 55 in series with switches a, b and c. Switch e of relay 52 connects a wire 58 at logic unit 11 to a wire 59 that leads back to logic unit 11 for emergency communication. Relay 52 is energized via a trainline emergency wire 60 and a branch wire 60a, while relay 53 is energized via a wire 61 that is connected to timer 14. A wire 61a connects a zero speed signal to the reset input of timer 14, in order to reset the timer following expiration of the time period during an emergency stop.

A signal wire 62 of transducer 29 is connected to logic unit 11 as an input corresponding to the braking pressure effective at brake units 19. Additional inputs, such as, wheel/axle speed signals, a dynamic brake feedback signal, a weight signal according to the pressure of a respective truck air spring, and B+ and B− signals are connected to logic unit 11 via wires 63, 64, 65, 66 and 67. An output signal, generated by logic unit 11, is conducted via wire 68 as an indication of the operative condition of various components that are monitored within electronic control unit 10 and pneumatic operating unit 16.

Input/output logic unit 11, 11' includes electric blending circuitry for controlling service braking such that smooth and continuous blending of friction braking with the available dynamic braking is achieved, in order to satisfy the servive brake command, and thus control the rate of train deceleration accordingly. Signal wire 24 carries the brake command signal to logic unit 11, 11', where the friction/dynamic brake blending circuitry responds to control energization of supply and exhaust magnet valves 27, 28 of the respective trucks via wires 55, 54. This friction/dynamic brake blending circuitry is hereby incorporated in the present application by reference to U.S. Pat. No. 3,490,814.

Input/output logic unit 11, 11' further includes a wheel-slip control circuit, which responds to wheel-/axle speed signals via wires 63 of the respective trucks for sensing a wheel-slide condition, in order to operate supply and exhaust magnet valves 27, 28 via wires 55, 54 to a release state in which brake pressure is dumped to atmosphere to momentarily release the brakes on the truck experiencing the detected wheel/axle slid condition. This wheel-slip control circuit is hereby incorporated in the present application by reference to U.S. Pat. Nos. 4,486,839 and 4,491,920.

In actual practice, electronic control unit 10 may be a hybrid analog/digital microprocessor based unit.

In operation of the embodiment of FIG. 1, emergency relay 52 is energized in the absence of an emergency brake application. Thus, during normal brake control, switch arms a, b, c, d and e of relay 52 are closed. Also, in the absence of a wheel-slide condition, relay 53 is deenergized such that switch arms f, g and h engage their back contacts. Accordingly, logic units 11, 11' are effective to control the respective truck brake units 19, 19' via pneumatic operating units 16, 16'. The following Table I shows the condition of energization of the respective magnet valves 26, 27 and 28 of operating unit 16 under different operating conditions. Since operating unit 16' is identical, its components are not shown.

TABLE I

|  |  | VALVES |  |  |
|---|---|---|---|---|
|  |  | 26 | 28 | 27 |
| SERVICE | APPL. | E | D | D |
|  | LAP | E | E | E |
|  | REL. | E | D | E |
| SER. WHEEL-SLIP |  | E | D | E |
| EMERGENCY |  | D | D | D |
| EMERGENCY WHEEL-SLIP |  | D | D | E |

Assuming the effective dynamic brake is insufficient to satisfy the brake command signal transmitted along wire 24, the friction/dynamic brake blending circuitry incorporated by reference in logic unit 11 will energize magnet valve 26 via wire 56, and deenergize magnet valves 28 and 27 via wires 54 and 55, as shown in the application condition of Table I. Pneumatic pressure is thus connected to the vehicle brake units 19 from supply reservoir 20 via pipe 31, inlet 30 and outlet 32 of flow-regulating magnet valve 26, choke 37, pipe 35, variable load valve 25 which limits the maximum pressure at output 40 according to the air spring pressure and iput 38, inlet 42 and delivery port 43 of supply magnet valve 27 and piping network 44. Choke 37 is selected in accordance with the supply reservoir pressure and the volumetric capacity of the pneumatic brake system such that, the rate of pressure buildup at brake units 19 closely parallels, but does not exceed, the jerk rate of the brake demand signal. Consequently, the feedback signal from pressure transducer 29 to logic unit 11, via wire 62, tends to track with the jerk rate of the brake command signal so as to not cause ON/OFF cycling of valve 27. When the brake cylinder pressure is such that the pressure feedback signal, combined with the dynamic brake feedback signal at wire 64, satisfies the brake command signal input at wires 24 and 24a, supply and exhaust magnet valves 27 and 28 will be energized via wires 55 and 54. In this condition, brake pressure is connected via delivery port 43 and outlet port 46 of supply valve 27 to inlet 48 of exhaust valve 28 where the pressure is cut off from atmosphere at outlet 49. This constitutes a lap condition of the brakes, as shown in Table I, in which no further change in brake pressure occurs, since the friction brake has supplemented the available dynamic brake to the extent necessary to satisfy the brake command.

When the brake command signal is reduced, the combined dynamic and friction brake feedback signals, via wires 64 and 62, will exceed the brake command, resulting in exhaust magnet valve 28 becoming deenergized (as shown in Table I) for release condition. In the deenergized state of exhaust magnet valve 28, inlet port 48 is connected to atmosphere at outlet port 49. The pressure at brake units 19 is thus released via piping network 44, delivery port 43 and outlet port 46 of supply valve 27, pipe 47, and the atmospheric connection made by exhaust magnet valve 28. If a partial release is indicated by the brake command signal, exhaust magnet valve 28 will become energized to reestablish a lap condition when the combined dynamic and friction brake feedback signals match the reduced level of the brake command signal. If full release is called for, exhaust magnet valve 28 will remain deenergized to establish a complete release of friction brake pressure.

It will now be appreciated that since supply and exhaust magnet valves 27 and 28 are high capacity components and thus are capable of satisfying the high-capacity requirement of brake units 19 without a relay valve, as previously discussed, these devices can be operated directly to obtain the wheel-slip and emergency brake functions heretofore requiring additional components.

For example, when a wheel-slip condition is sensed during normal (service) brake operation, electronic control unit 10 will operate to cause the wheel-slip control circuitry (incorporated by reference in this application) to energize flow-regulating magnet valve 26 via wire 56, deenergize exhaust magnet valve 28 via wire 54, and energize supply magnet valve 27 via wire 55 (as shown in Table I), such wheel-slip control being capable of overriding the heretofore-discussed control of the pneumatic operating unit by the dynamic/friction brake blending circuitry. It will be noted from Table I that the state of magnet valves 27 and 28, during a wheel-slip condition, corresponds to the state of these valves during a brake release operation.

It will also be noted that flow-regulating magnet valve 26 remains in its energized state during wheel-slip operation, so that brake pressure can be reapplied following the momentary dumping of brake pressure.

When an emergency brake application is desired, the normally energized trainline wire 60 is deenergized, as by movement of the operator's brake valve device to emergency position. Emergency relay 52 thus drops out and its contacts a, b, c, d and e are opened to interrupt the supply of power to magnet valves 26, 27 and 28 via wires 56, 54 and 55. As can be seen from Table I, this results in a deenergized condition of the respective magnet valves, which corresponds to an emergency brake application. Supply pressure is connected to brake units 19 from reservoir 20 via pipe 31, inlet 30 and outlet 33 of magnet valve 26 in bypass of choke 37, pipe 35, supply port 36 and delivery port 40 of variable load valve 25, pipe 41, inlet 42 and delivery port 43 of supply valve 27, and piping network 44. In bypassing choke 37, braking pressure is supplied to the brake units 19 at a substantially unrestricted rate conducive to emergency braking. However, while this emergency brake pressure is supplied at a fast rate, the maximum pressure attainable is limited by variable load valve 25 in accordance with the vehicle load condition, as determined by the vehicle air spring pressure transmitted to variable load valve control port 38 via pipe 39. It will be appreciated, therefore, that for greater vehicle loading, higher maximum emergency brake pressures are provided to optisize brake response and stopping time without inducing wheel-slide. It will be further appreciated that an emergency brake application takes priority over wheel-slide control, which therefore is not normally provided under emergency braking through the electronic control unit 10.

In addition to the aforementioned electric initiation of an emergency brake application through emergency trainline wire 60, a pneumatic emergency may also be obtained through the pneumatic pilot control of the respective magnet valves 26, 27 and 28. In the absence of pneumatic pressure to the pilot portion of these magnet valves, the valves are rendered unresponsive to the supply of electrical power to the valve solenoid portion.

Thus, valves 26, 27 and 28 assume a condition corresponding to deenergization even if electrical power is provided. As can be seen from Table I, deenergization of valves 26, 27 and 28 corresponds to an emergency brake application.

With three-way cock 50a positioned to connect main reservoir pressure to the pilot portion of magnet valves 26, 27 and 28, via piping network 50, it will be appreciated that in the absence of pilot pressure, due to a break in pipe 22, for example, magnet valves 26, 27 and 28 will revert to their deenergized state and an emergency brake application will result through these magnet valves in the same manner as explained relative to deenergization of emergency wire 60.

With the three-way cock positioned to connect brake pipe pressure to the pilot portion of magnet valves 26, 27 and 28, via piping network 50, a loss of pilot pressure, due to a break in brake pipe 51, will result in deenergization of magnet valves 26, 27 and 28 to cause an emergency brake application also. Moreover, employing brake pipe pressure as the pilot, control of magnet valves 26, 27 and 28 gives the operator the option of effecting a pneumatically-initiated emergency application through a conventional operator's brake valve device or the like. In this regard, the electrically-initiated emergency control of the pneumatic brake units 19 can be eliminated, if desired.

If wheel-slip control is desired during emergency brake operation, timer circuit 14 of logic unit 11 may be activated to control wheel-slip relay 53. When a wheel-slip condition is sensed by the wheel-slip control circuitry (incorporated by reference in this application), timer circuit 14 emits a timing signal, via wire 61, to energize wheel-slip relay 53 for a predetermined time period, such as 5 seconds. In the energized state of relay 53, its switch arms f, g and h are switched from their normal position on the back contacts to the front contacts, whereby wires 54a, 55a and 57b are connected to wires 54, 55 and 57a, leading to magnet valves 27 and 28. This provides a control path from logic unit 11 to the supply and exhaust magnet valves in bypass of the open emergency contacts a, b, c, d and e. Accordingly, the wheel-slip signal results in logic unit 10 effecting energization of magnet valve 27 and deenergization of magnet valve 28, as shown in Table I, under the emergency wheel-slip condition. Emergency brake pressure at brake units 19 is dumped to atmosphere via piping network 44, delivery port 43 and outlet 46 of supply valve 27, pipe 47, inlet 48 and outlet 49 of exhaust valve 28, and the vent connection thereat. It will be appreciated that this dumping of emergency brake pressure occurs in the same manner as the previously-discussed dumping of normal or service brake pressure due to wheel-slip. However, flow-regulating valve 26 remains deenergized under the emergency wheel-slip condition so that, upon correction of the wheel-slip or expiration of the time period set by timer 14, pneumatic pressure will be resupplied at an emergency rate, i. e., in bypass of choke 37. Typically, this 5 sec. time period set by timer 14 is sufficient to correct a wheel-slip condition. It will be appreciated, therefore, that as long as the wheel-slip correction is achieved within the time period set by timer 14, 14', the timer will be reset to permit continued cycles of wheel-slip control. The timer is reset, in this case, through the wheel-slip control circuitry of logic units 11, 11' incorporated herein by reference. The timer period is chosen in accordance with the time normally required to correct a wheel-slip and thus serves to safeguard the system against loss of emergency brake control due to a malfunction in the wheel-slip control circuitry. Should the timer period expire before a wheel-slip correction has been achieved, a malfunction is indicated and the relay is not reset until a zero speed signal is provided at line 161a when the train comes to a complete stop in response to the emergency brake application. Such an arrangement, in providing wheel-slip control, inherently protects against loss of emergency braking ability, while preserving the emergency stopping function in the event of a malfunction in the wheel-slip control circuitry.

Figure 5:
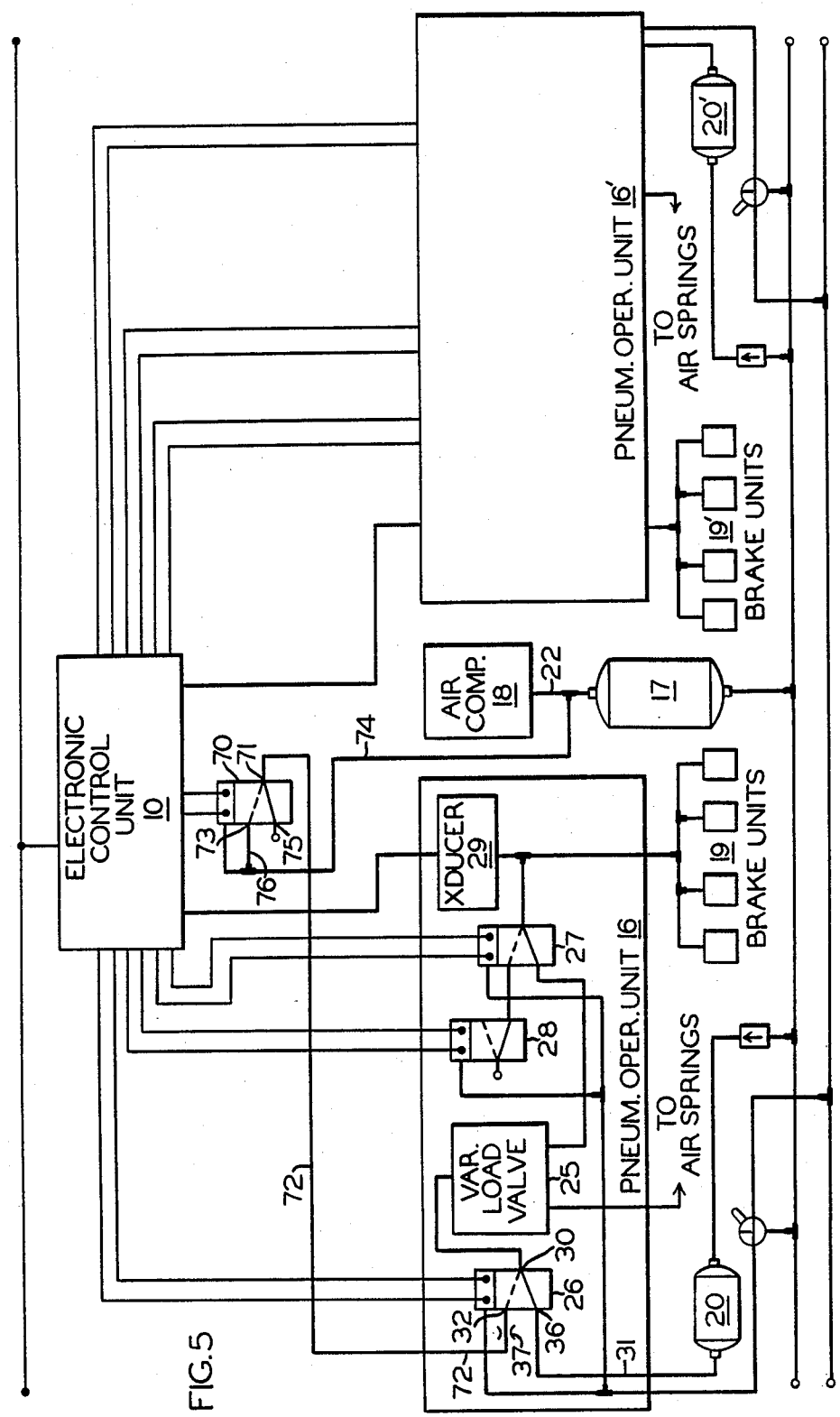
FIG. 5 is a schematic and block diagram of an embodiment similar to the FIG. 3 embodiment arranged to provide different sources of pneumatic pressure for service and emergency braking.

In the embodiment of FIG. 5, the arrangement is similar to that of FIG. 3, except that the inlet and outlet port connections of flow-regulating valve 26 are reversed from the arrangement of FIG. 3 to accommodate two separate sources of supply fluid pressure for the service and emergency braking. Also, a malfunction detection magnet valve device 70 is provided to assure a release of the brakes on a car of a train having an electronic malfunction, which would otherwise apply the brakes on that particular car. This latter feature is intended to safeguard cars in a train not equipped with a train-line control wire via which the operator could be apprised of a malfunction-caused brake application on a car of the train, by releasing such a brake application. This prevents the car from being pulled along with the brakes applied without the operator's knowledge.

Malfunction-detection valve 70 is a conventional two-position, air-piloted, three-way, electropneumatic valve connected electrically to electronic control unit 10. The valve connections in the two positions are represented diagrammatically by a solid line in a deenergized condition, and by a dotted line in an energized condition. A delivery port 71 of valve 70 is connected to one inlet 32 of flow-regulating valve 26 via a pipe 72. In the present arrangement, valve 26 may be pneumatically-piloted either with a solenoid operator, as shown, or without a solenoid operator. An inlet 73 of valve 70 is connected to main reservoir pipe 22, via a pipe 74, while an outlet 75 is vented to atmosphere. Choke 37 may be located either in port 32 or in pipe 72 at the port connection. A branch pipe 76 of pipe 74 is connected to the pneumatic pilot operator portion of valve 70. A second inlet port 33 of flow-regulating valve 26 is connected to supply reservoir 20, via pipe 31, while the outlet port 30 of valve 26 is connected to the inlet port of variable load valve 25.

In operation, this embodiment of the invention is basically the same as the embodiment of FIG. 3, as represented by the condition of the respective magnet valves 26, 27 and 28, shown in Table I, except that during service braking, main reservoir pressure is provided as the source of pressure that is connected to the vehicle brake units 19.

When flow-regulating magnet valve 26 is energized, in accordance with a service brake application, ports 32 and 30 are interconnected, while concurrently, malfunction-detection valve 70 is normally energized to interconnect ports 71 and 73 thereof. Consequently, main reservoir pressure is connected to brake units 19 at a service rate via pipe 74, magnet valve 70, pipe 72, choke 37, magnet valve 26, variable load valve 25, supply magnet valve 27, and piping network 44.

In the event a malfunction should occur at electronic control unit 10, malfunction-detection valve 70 becomes deenergized, whereby port 73 is cut off from port 71 thereof, and is vented to atmosphere via port 75. In this manner, any pressure effective at brake units 19 is vented to atmosphere to ensure that a service brake application on the car experiencing the malfunction is released and that this car's brakes cannot be applied without the operator's knowledge of the existing malfunction.

On the other hand, an emergency brake application is made when magnet valve 26 is deenergized, in which condition port 33 of magnet valve 26 is interconnected with port 30 in bypass of choke 37. In this position, the source of pressure is supply reservoir 20, which is connected at an unrestricted or emergency rate to the vehicle brake units via pipe 31, flow-regulating magnet valve 26, variable load valve 25, supply magnet valve 27, and piping network 44. It will be appreciated that, during an emergency brake application, supply pressure is connected to the brake units in bypass of malfunction-detection valve 70, since an emergency brake application is initiated through brake pipe 51 under control of the operator, and thus does not require an interlock, as provided by malfunction-detection valve 70.

Figure 4:
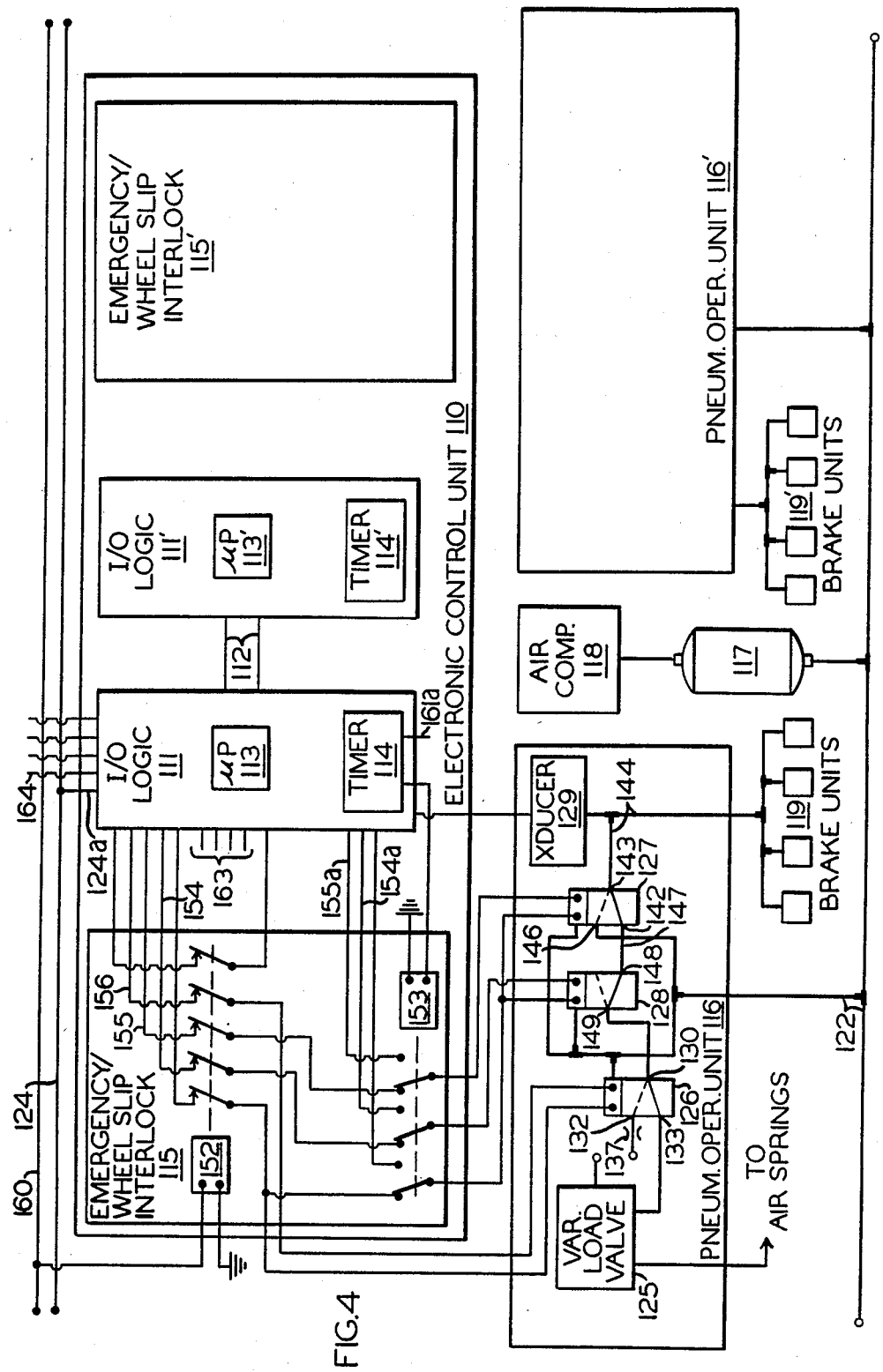
FIG. 4 is a schematic and block diagram of an embodiment showing a spring-applied brake system.

In the embodiment of FIG. 4, the vehicle brake units are spring-applied, as opposed to the pressure-applied brake units in the FIG. 3 embodiment. While the FIG. 4 embodiment is basically similar to the FIG. 3 embodiment, a slightly different arrangement of the pneumatic components comprising pneumatic operating unit 116 is required to control the brake unit air pressure which, in turn, controls the effectiveness of the brake unit actuating spring, and thus the degree of brake effort obtained. These spring-applied, air-released brake units 119 are conventional and well-known in the railway brake art. Microprocessor 113, of electronic control unit 116, is programmed in accordance with the inputs received by logic unit 111 to control conventional, air-piloted, solenoid-operated, electropneumatic valves 126, 127 and 128 to obtain the desired brake control functions, as shown by the following Table II.

TABLE II

|  | | VALVES | | |
| --- | --- | --- | --- | --- |
|  | | 126 | 127 | 128 |
| SERVICE | APPL. | E | D | D |
|  | LAP | E | D | E |
|  | REL. | E | E | E |
| SER. WHEEL-SLIP | | E | E | E |
| EMERGENCY | | D | D | D |
| EMERGENCY WHEEL-SLIP | | D | E | E |

A comparison of Tables I and II will show that a somewhat different control of the respective electropneumatic valves in the two embodiments of the invention is required, so that the programming of microprocessors 13 and 113 is necessarily dif- ferent.

Figure 6:
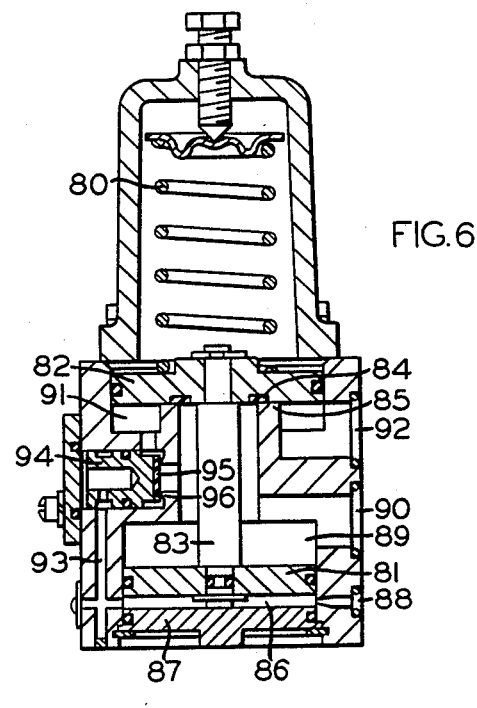
FIG. 6 is a sectional assembly view of an inverse-type variable load valve device, as employed in the embodiment of FIG. 4.

In addition, variable load valve 125 in FIG. 4 differs from variable load valve 25 of FIG. 3, in order to adjust the minimum brake cylinder air pressure during emergency brake applications according to the vehicle load condition. In this sense, variable load valve 125 operates on the inverse principle, i. e., as the vehicle load increases, the pneumatic brake pressure at the spring-applied brake units—during an emergency brake application—decreases, thereby increasing the braking force exerted by the brake unit spring. An example of such an inverse-type variable load valve is shown in FIG. 6. A manually adjustable spring 80 acts in a downward direction on a piston assembly comprising a control piston 81 and a piston valve 82 that are interconnected by a stem 83, so as to move in unison. A valve element in the form of a seal ring 84 is engageable with an annular valve seat 85 under the influence of spring 80. A pressure chamber 86 is formed between the face of control piston 81 and a closure member 87 that is held in place by a snap ring. This chamber is subject to air spring pressure supplied, via port 88, as an indication of the vehicle load condition. Intermediate the opposite face of control piston 81 and the area of piston valve 82, within the periphery of seal ring 84, is a chamber 89 having an atmospheric port 90. Another pressure chamber 91 is formed between the underside of piston valve 82 without the periphery of seal ring 84 and a portion of the valve body on which seat 85 is formed. This chamber 91 is subject to brake pressure supplied via a port 92. A passage 93 is connected between pressure chamber 86 and the face of a piston valve 94 having a seal ring 95 that is engageable with a valve seat 96 between pressure chamber 91 and atmospheric chamber 89.

Spring 80 is adjusted to counter the effective air spring pressure exerted on control piston 81 for a maximum vehicle load condition, so that seal ring 84 is held in engagement with seat 85 under all conditions of vehicle loading. In a fully-loaded vehicle, the counterforce exerted by spring 80 creates a small force differential, while a progressively larger force differential exists as the vehicle load condition is reduced. It will be apparent, therefore, that the braking pressure delivered to chamber 91 is exhausted via seat 85, chamber 89, and atmospheric port 90 by raising piston valve 82 off seat 85. Depending upon the existing force differential, which decreases as the vehicle load increases, different amounts of brake cylinder pressure are exhausted before the piston valve 82 is reengaged with seat 85. Thus, the lighter the vehicle load, the higher the force differential, and therefore a lesser brake pressure that is exhausted. In the present invention, in which this brake pressure is used to oppose a spring-applied brake, the resulting higher brake pressure results in a lower maximum brake force exerted by the spring-applied, air-released brake units 119 employed in the embodiment of FIG. 4.

In operation of the embodiment of FIG. 4, magnet valve 126 is energized and magnet valves 127 and 128 are deenergized in response to a service brake command. Consequently, the normally present brake unit pressure is vented to atmosphere via piping network 144, delivery port 143 and inlet 142 of supply valve 127, pipe 147, an inlet 148 and outlet 149 of exhaust valve 128, an inlet 130 and atmospheric outlet 132 of flow-regulating valve 126. Choke 137 at outlet 132 restricts the exhaust of pneumatic pressure from the brake units to a rate corresponding to a service brake application, as opposed to an emergency application. As the pneumatic pressure is exhausted, the brake spring becomes increasingly effective to apply the vehicle friction brakes. Feedback transducer 129 transmits a signal, corresponding to the effective pneumatic pressure, to the blending circuitry of electronic control unit 110, incorporated by reference in this application.

When the friction brake feedback signal—in conjunction with the dynamic brake feedback signal transmitted to electronic control unit 110 via wire 164—matches the brake command signal transmitted via P-wire 160, sufficient friction braking is indicated. Accordingly, input-/output logic unit 111 outputs a signal, via wire 154, to energize magnet valve 128 and thereby terminate further exhaust of pneumatic pressure from brake units 119. Magnet valve 127 remains in its deenergized condition, as shown by the lap position in Table II, wherein supply pressure at port 146 of the supply valve remains cut off from port 143 and brake units 119 via piping network 144. Thus, the pneumatic pressure controlling the brake unit application spring is held constant, at a value corresponding to the friction brake level required to supplement the dynamic brake to the extent necessary to satisfy the brake command signal.

If a brake release is indicated by a reduction in the P-wire signal, transmitted via wire 124, the electronic control unit blending circuitry will respond to energize magnet valve 127 via wire 155, while magnet valve 128 will remain energized via wire 54, as shown in Table II. Thus, exhaust of pneumatic pressure from brake units 119 remains cut off, while concurrently supply pressure is connected to the brake units via main reservoir pipe 22 leading to port 146 of magnet valve 127. This pressure increase opposes the brake unit application spring to relieve the brake pressure in proportion to the presure increase.

In the event wheel-slip signals 163 at logic unit 111 indicate a wheel-slip exists, due to excessive friction braking force for example, these signals will be interpreted by micro processor 113 to cause logic unit 111 to in turn output signals via wires 154 and 155, whereby magnet valves 127 and 128 are energized. As can be seen by Table II, this condition of valves 127 and 128 corresponds to a brake release condition, in which pressure is supplied to brake units 119 to effect a retraction of the brake unit application spring, and thus a reduction of spring braking force sufficient to allow the slipping wheel to regain rotation.

It will be appreciated that in each of the foregoing conditions, the flow-regulating magnet valve 126 is energized via wire 156, whereby the exhaust of pneumatic pressure from brake units 119 is via the control choke 137 to provide braking at a service rate.

In the event an emergency brake application is called for, as by deenergization of emergency wire 160, each magnet valve 126, 127 and 128 is deenergized (as shown in Table II) by relay 52 of emergency/wheel-slip interlock circuit 115. This results in magnet valves 127 and 128 operating (as explained above for a service brake application) by exhausting pneumatic pressur from brake units 119. However, in the deenergized condition of magnet valve 126, port 130 is connected to port 133 leading to atmosphere via variable load valve 125. In this sense, pneumatic pressure at brake units 119 is exhausted in bypass of choke 137 so as to be unrestricted consistent with an emergency brake application. At the same time, the effect of variable load valve 125 on the exhausting pressure is to limit this pressure to a minimum value that becomes greater as the carloading decreases, thereby increasing the braking effect of the spring brake with vehicle loading during emergency.

If a wheel-slip arises during an emergency application, magnet valves 127 and 128 are energized (as shown in Table II) via wires 154a and 155a in bypass of the emergency relay contacts. It will be appreciated that this energized condition of the respective magnet valves 127 and 128 corresponds to the service release and wheel-slip condition in which pneumatic pressure is supplied to the brake units to retract the brake unit application spring and thereby release the spring brake, as previously explained. Flow-regulating valve 126 remains conditioned for emergency operation, i.e., deenergized, so that following the wheel-slip control function, the pneumatic pressure at brake units 119 will be immediately exhausted as the magnet valves 127 and 128 return to their deenergized condition. This is assured by timer 114, which activates emergency wheel-slip relay 153 only for a limited time period. As in the embodiment of FIG. 3, relay 114, 114' is resettable to permit continuous cycles of wheel-slip control during the emergency application, provided brake reapplication occurs before the timer period has expired. This is accomplished through the wheel-slip control circuitry of logic units 111, 111', which is incorporated herein by reference. The timer period is chosen in accordance with the time normally required to correct a wheel-slip and thus serves as a means of safeguarding the system against loss of emergency brake control due to a malfunction in the wheel-slip control circuitry. Should the time period expire before a wheel-slip correction has been achieved, a malfunction is indicated and the relay is not reset until a zero speed signal is provided at line 161a when the train comes to a complete stop in response to the emergency brake application.

In each of the embodiments of FIGS. 3, 4 and 5, which control the vehicle brakes on a per-truck basis, i.e., separate controls for each truck, a checked redundancy is provided. Therefore, if a malfunction of either the electronic or control equipment components occurs, then the control equipment associated with the remaining truck is still operational. A common link provided by wires 12 in FIG. 3 and 112 in FIG. 4, between logic units 11, 11' in FIG. 3 and 111, 111' in FIG. 4 serves the purpose of fault detection, annunciation, and component failure limp-in operation.

Because of the nature of the pneumatic component arrangement, highly accurate feedback of the brake unit pneumatic pressure is transmitted to the logic units, which can thus be assigned any number of monitoring and annunciation tasks. This reduces the number of brake cylinder pressure monitoring devices required, thus reducing the cost of hardware complexity. Moreover, such an arrangement lends itself to a wide range of customer specifications without requiring extensive hardware modifications, since different contract requirements can be accommodated simply through software modifications.

Having now described the invention, what we claim as new and desire to secure by Letters Patent, is:

1. For a railway vehicle having a brake command signal, a dynamic brake feedback signal, brake means for providing friction braking, a friction brake feedback signal, and a first source of fluid under pressure, an electropneumatic braking system comprising:
   (a) an electronic control unit operative in response to changes in said brake command signal, said dynamic brake feedback signal, and said friction brake feedback signal to provide first and second friction brake signals;
   (b) electropneumatic valve means for selectively controlling said brake means in response to said first and second friction brake signals to effect the application and release of friction braking of said vehicle;
   (c) a first flow path via which said source of fluid pressure is communicated with said electropneumatic valve means;
   (d) a second flow path communicating said electropneumatic valve means to atmosphere;
   (e) said electropneumatic valve means being located between said brake means and said first and second flow paths, so that in response to one of said first and second friction brake signals, said brake means is pressurized, and in response to the other of said first and second friction brake signals, said brake means is vented; and (f) choke means in one of said first and second flow paths for providing a fast-rate flow restriction thereat.

2. A braking system, as recited in claim 1, further characterized by a direct flow path between said electropneumatic means and said brake means.

3. A braking system, as recited in claim 2, further comprising a pressure-to-electric transducer subject to the fluid pressure effective in said direct flow path between said electropneumatic means and said brake means to provide said friction brake feedback signal.

4. A braking system, as recited in claim 3, further characterized in that the fast-rate flow restriction provided by said choke means is such that the rate of flow of fluid pressure in said one of said first and second flow paths established by said electropneumatic means causes said pressure-to-electric transducer to provide said friction brake feedback signal with a rate of change that corresponds with the rate of change of said brake command signal.

5. A braking system, as recited in claim 4, wherein said fluid pressure brake means is at least one fluid-pressure-actuated brake unit.

6. A braking system, as recited in claim 5, wherein said electropneumatic valve means comprises:

(a) an electrically-operated supply valve having a delivery port connected to said fluid-pressure-actuated brake unit, an inlet port connected to said source of fluid pressure and an outlet port, fluid pressure communication between said inlet and delivery ports of said supply valve being established in a deenergized condition and fluid pressure communication between said outlet and said delivery port of said supply valve being established in an energized condition; and (b) an electrically-operated exhaust valve having an inlet port connected to said outlet of said supply valve and an outlet connected to atmosphere via said second flow path, fluid pressure communication between said inlet and outlet of said exhaust valve being established in a deenergized condition.

7. A braking system, as recited in claim 6, further comprising a flow-regulating valve having an inlet connected to said source of fluid pressure, a first outlet via which fluid pressure at said inlet is connected to said inlet of said supply valve in a normal condition of operation, and a second outlet having said choke means via which fluid pressure at said inlet of said flow-regulating valve is connected to said inlet of said supply valve in an emergency condition of operation.

8. A braking system, as recited in claim 7, further characterized in that said flow-regulating valve comprises:

(a) a normally energized solenoid operator connected to said electronic brake unit; and (b) a pneumatic pilot portion to which fluid under pressure is normally connected to provide said normal operative condition, when said solenoid operator is energized, and to provide said emergency condition in the absence of fluid pressure at said pilot portion.

9. A braking system, as recited in claim 7, further comprising variable load valve means in said first flow path for limiting the maximum pressure supplied from said source of fluid pressure to said inlet of said supply valve according to the vehicle load condition.

10. A braking system, as recited in claim 8, further characterized in that said electronic control unit provides a third friction brake signal in response to said brake command signal to effect energization of said solenoid operator of said flow-regulating valve, whereby said source of fluid pressure is connected to said first flow path via said choke means so that upon said deenergization of said supply valve, fluid pressure is connected with said at least one brake unit at a rate consistent with a normal brake operation.

11. A braking system, as recited in claim 10, further comprising emergency interlock means between said electronic control unit and said pneumatic operating unit for interrupting transmission of said third friction brake signal to said flow-regulating valve to effect deenergization thereof in response to an emergency brake command signal, whereby said source of fluid pressure is connected to said first flow path in bypass of said choke means so that upon deenergization of said supply valve, fluid pressure is connected with said at least one brake unit at a rate consistent with an emergency brake operation.

12. A braking system, as recited in claim 11, further characterized in that said emergency interlock means interrupts transmission of said first and second friction brake control signals to said supply and exhaust valves to effect deenergization thereof in response to said emergency brake command signal, whereby emergency brake operation is effected.

13. A braking system, as recited in claim 12, further comprising wheel-slip interlock means for providing control of said supply valve by said electronic control unit in bypass of said emergency interlock means when a wheel-slip condition exists during an emergency brake application, whereby said supply valve is energized.

14. A braking system, as recited in claim 13, further comprising timer means for providing a predetermined period of time during which said wheel-slip interlock means is enabled to effect said control of said supply valve in bypass of said emergency interlock means.

15. A braking system, as recited in claim 14, further characterized in that said timer circuit is resettable in response to stopping of said vehicle, so that said venting of said fluid under pressure from said brake means to atmosphere in response to a wheel-slip is limited to a single occasion during each said emergency brake application.

16. A braking system, as recited in claim 6, wherein said electrically-operated supply and exhaust valves each comprise:

(a) a solenoid operator to which said friction brake control signals are connected; and (b) a pilot portion to which fluid under pressure is normally connected.

17. A braking system, as recited in claim 4, wherein said fluid pressure brake means is a spring-actuated, fluid-pressure-released brake unit.

18. A braking system, as recited in claim 17, wherein electropneumatic valve means comprises:

(a) an electrically-operated supply valve having a delivery port connected to said at least one fluid-pressure-actuated brake unit, an inlet connected to said source of fluid pressure, and an outlet port, fluid pressure communication between said inlet and delivery port of said supply valve being established in deenergized condition and fluid pressure communication between said outlet and said delivery port of said supply valve being established in an energized condition;

(b) an electrically-operated exhaust valve having an inlet port connected to said outlet of said supply valve and an outlet connected to atmosphere via said second flow path, fluid pressure communication between said inlet and outlet of said exhaust valve being established in a deenergized condition; and (c) an electrically-operated flow-regulating valve having an inlet connected to said second flow path, and first and second outlets, each connected to atmosphere via a respective third and fourth flow path, said first outlet having said choke means, fluid pressure communication between said inlet and said first outlet of said flow-regulating valve being established in an energized condition thereof and fluid pressure communication between said inlet and said second outlet of said flow-regulating valve being established in a deenergized condition thereof.

19. A braking system, as recited in claim 18, further comprising variable load valve means in said fourth flow path for limiting the maximum pressure vented from said brake units via said second flow path according to the load condition of said vehicle.

20. A braking system, as recited in claim 19, further characterized in that said electronic control unit provides a third friction brake signal in response to said brake command signal to effect energization of said flow-regulating valve, whereby fluid pressure communication is established between said second and third flow paths so as to provide for venting fluid under pressure from said at least one brake unit at a rate consistent with a normal brake operation.

21. A braking system, as recited in claim 20, further comprising emergency interlock means between said electronic control unit and said pneumatic operating unit for interrupting transmission of said third friction brake control signal to said flow-regulating valve to effect deenergization thereof in response to an emergency brake command signal, whereby fluid pressure communication is established between said second and fourth flow paths in bypass of said choke means, so as to provide for venting fluid under pressure from said at least one brake unit at a rate consistent with an emergency brake operation.

22. A braking system, as recited in claim 21, further characterized in that said emergency interlock means interrupts transmission of said first and second friction brake control signals to said supply and exhaust valves to effect deenergization thereof in response to said emergency brake command signal, whereby emergency brake operation is effected.

23. A braking system, as recited in claim 22, further comprising wheel-slip interlock means for providing control of said supply and exhaust valves by said electronic control unit in bypass of said emergency interlock means when a wheel-slip condition exists during an emergency brake application, whereby said supply and exhaust valves are energized.

24. A braking system, as recited in claim 23, further comprising timer means for providing a predetermined period of time during which said wheel-slip interlock means is enabled to effect said control of said supply and exhaust valves in bypass of said emergency interlock means.

25. A braking system, as recited in claim 24, further characterized in that said timer circuit is resettable in response to correction of a wheel-slip condition within said predetermined time period, whereby continued cycles of wheel-slip control is permitted.

26. A braking system, as recited in claim 16, wherein said electrically-operated, supply, exhaust, and flow-regulating valves comprise:

(a) a solenoid operator to which said friction brake control signals are connected; and (b) a pilot portion to which fluid under pressure is normally connected.

27. A braking system, as recited in claim 6, further comprising:

(a) a second source of fluid under pressure;

(b) a flow-regulating valve having a first inlet to which said first source of fluid under pressure is connected, a second inlet to which said second source of fluid under pressure is connected, and an outlet to which one of said first and second inlets is connected to provide one of said first and second sources of fluid pressure at said inlet port of said supply valve depending upon said regulating valve being in an emergency or normal condition of operation; and (c) said choke means being at one of said first and second inlets to provide a restricted rate of flow of fluid under pressure thereat when said flow-regulating valve is in said normal operative condition.

28. A braking system, as recited in claim 27, further comprising:

(a) a brake pipe normally charged with fluid under pressure; and (b) said flow-regulating valve including a pneumatic pilot portion having fluid pressure communication with said brake pipe, so that in the presence of said brake pipe fluid pressure, said flow-regulating valve is operated to said normal operative condition; and in the absence of said brake pipe fluid pressure, said flow-regulating valve is operated to said emergency condition.

29. A braking system, as recited in claim 27, wherein said flow-regulating valve comprises a solenoid operator to which said electronic control unit is connected, said electronic control unit providing a third friction brake signal in response to said brake command signal to establish said normal and emergency conditions of operation of said flow-regulating valve.

30. A braking system, as recited in claim 28, further comprising a malfunction-detection valve means interposed between said second source of fluid under pressure and said one of said first and second inlets of said flow-regulating valve for interrupting the supply of fluid pressure to said supply valve when a malfunction of said electronic control unit is detected.

31. A braking system, as recited in claim 25, further characterized in that upon expiration of said predetermined time period before a wheel-slip condition is corrected, said timer circuit is only resettable in response to stopping of said vehicle.

* * * * *

UNITED STATES PATENT AND TRADEMARK OFFICE
CERTIFICATE OF CORRECTION

PATENT NO. : 4,598,953
DATED : July 8, 1986
INVENTOR(S) : James A. Wood & Richard J. Mazur It is certified that error appears in the above-identified patent and that said Letters Patent are hereby corrected as shown below:

Column 4, line 29, delete "2" and insert --3-- same line, delete "3" and insert --4-- line 48, delete "1" and insert --3--

Column 6, line 61, delete "1" and insert --3--

Column 16, clause (a), line 65, delete "actuated" and insert --released--

Signed and Sealed this

Thirteenth Day of January, 1987

Attest:

DONALD J. QUIGG

*Attesting Officer*  *Commissioner of Patents and Trademarks*